United States Patent [19]

Oettinger et al.

[11] Patent Number: 5,318,269
[45] Date of Patent: Jun. 7, 1994

[54] ELECTRONIC CONTROL SYSTEM FOR MAGNETIC VALVES OPERATED INDIVIDUALLY OR IN CASCADE

[76] Inventors: Rolf Oettinger, Hohbergstr. 7, W-7143 Vaihingen-Enz; Martin Latt, Schillerstr. 4, W-7015 Korntal-Münchingen, both of Fed. Rep. of Germany

[21] Appl. No.: 952,705
[22] PCT Filed: May 25, 1991
[86] PCT No.: PCT/DE91/00437
§ 371 Date: Nov. 13, 1992
§ 102(e) Date: Nov. 13, 1992
[87] PCT Pub. No.: WO92/00480
PCT Pub. Date: Jan. 9, 1992

[30] Foreign Application Priority Data

Jun. 30, 1990 [DE] Fed. Rep. of Germany ....... 4020934

[51] Int. Cl.$^5$ .............................................. F16K 31/06
[52] U.S. Cl. ............................ 251/30.01; 137/625.64; 251/129.04
[58] Field of Search ................ 137/625.64; 251/30.01, 251/129.04

[56] References Cited

U.S. PATENT DOCUMENTS 4,266,572  5/1981  Schuttenberg et al. ... 137/625.64 X
4,635,682  1/1987  Walters .......................... 137/625.64
4,928,730  5/1990  Ando .......................... 137/625.65 X

FOREIGN PATENT DOCUMENTS 0098719  1/1984  European Pat. Off. .
2256316  5/1973  Fed. Rep. of Germany .
2840831  4/1980  Fed. Rep. of Germany .
3825935  2/1989  Fed. Rep. of Germany .

Primary Examiner—Gerald A. Michalsky

[57] ABSTRACT

An electronic control system for individually operated magnetic valves and valve cascades automatically switches to individual operation or cascade operation by a switching logic. The switching logic detects the presence of an actual value signal of a main valve of a valve cascade so that the electronic control system is automatically adjusted to cascade operation in this case. In the absence of an actual value of the main valve, a cable interruption is detected and the final stage is locked. At −14 Volts at the main stage actual value input, the electronic control system is adjusted to the individual operation of a magnetic valve.

4 Claims, 1 Drawing Sheet

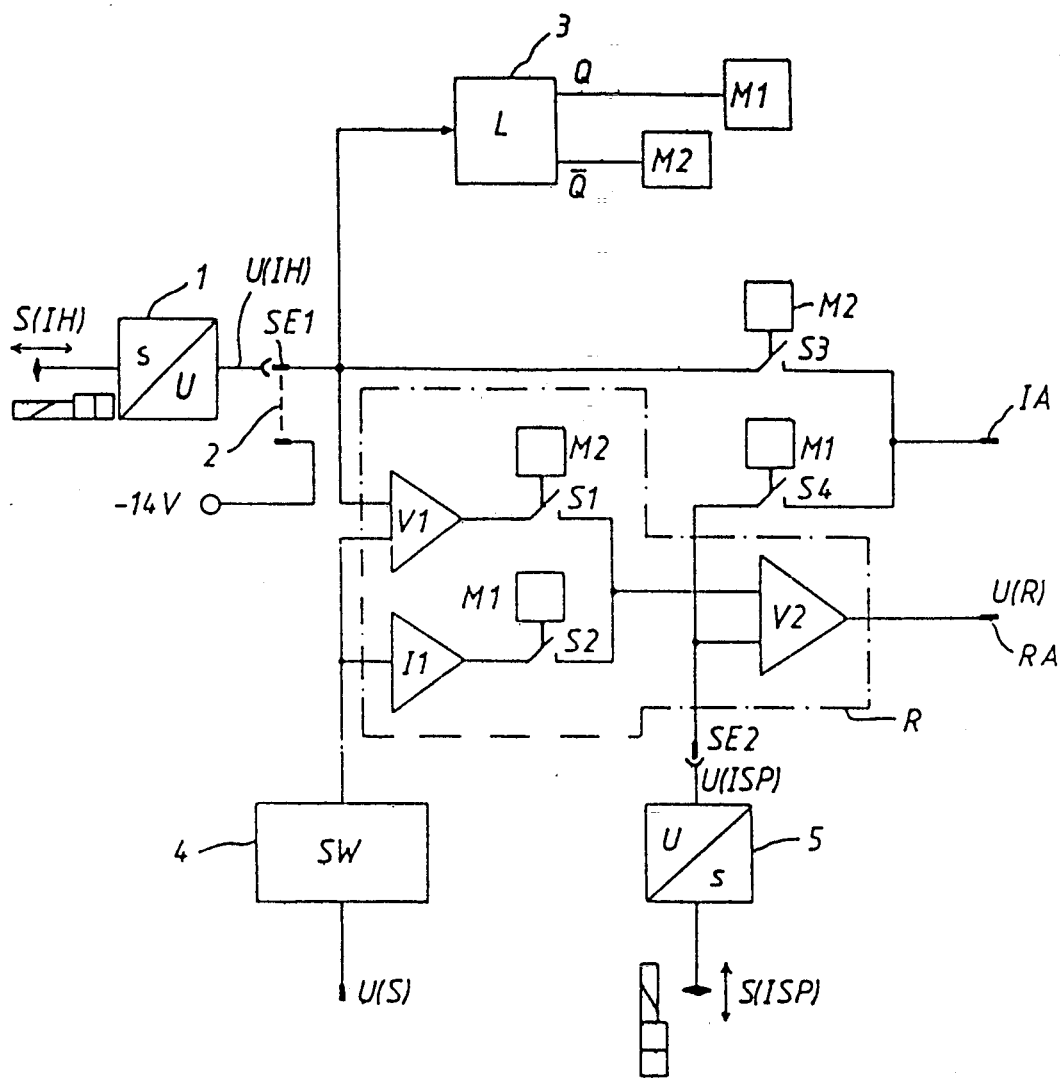

ELECTRONIC CONTROL SYSTEM FOR MAGNETIC VALVES OPERATED INDIVIDUALLY OR IN CASCADE

BACKGROUND OF THE INVENTION

The invention concerns an electronic control system for magnetic valves which are operated individually or in cascade.

Different drives can be used for the actuation of valves. Valves can be provided with a magnet drive for controlling low outputs, while higher outputs require a hydraulic drive. Accordingly, with lower output requirements a magnetic valve operated individually can be electrically adjusted by means of a regulator. With higher output requirements a magnetic valve is connected upstream of a hydraulically actuated main valve and the pressure medium for actuating the main valve is controlled via the magnetic valve. Together with the main valve, the magnetic valve forms a valve cascade in which the magnetic valve is operated as a pilot valve. The regulating voltage put out by the regulator does not act directly on the main valve which is actually to be adjusted, but rather is applied to the controlling magnet of the magnetic valve. A regulating voltage can be derived from a comparison between the reference value and actual value of the position of the main valve, which regulating voltage controls the magnetic valve connected upstream in such a way that the valve position of the main valve is adjusted to the reference value.

The electronic control system used to generate the regulating voltage is usually accommodated in a control unit arranged separately from the valves. Depending on the type of valve—individually operated magnetic valve or valve cascade including pilot valve and main valve—different circuit arrangements are used for the two different types of control. This has the disadvantage that the construction of the electronic control system must be adapted to the respective operating type - individual operation or pilot operation.

SUMMARY OF THE INVENTION

Accordingly, it is an object of the present invention to provide an electronic control system of the above mentioned type, which avoids the disadvantages of the prior art.

In keeping with these objects and with others which will become apparent hereinafter, one feature of the present invention resides, briefly stated, in an electronic control system for individually operated magnetic valves and for valve cascades with a magnetic valve operated as a pilot valve which controls a main valve acted upon by a pressure medium, a regulator generating the regulating voltage for the magnetic valve, characterized in that a signal input for the actual valve of the valve position of the main valve is connected with a switching logic which adjusts the electronic control system to individual operation when a constant level characterizing the individual operation is present at the control input or adjusts the electronic control system to pilot operation when the actual value of the valve position of the main valve is present at the control input, a regulator derives the regulating voltage from a comparison of the reference value with the actual value of the magnetic valve in individual operation and from a comparison of the reference value and actual value of the main valve in pilot operation.

When the electronic control system is designed in accordance with the present invention, it has the advantage over the prior art that a switching logic automatically adjusts the control from individual operation or pilot operation depending on the utilized valves. To this end the switching logic detects whether or not an actual value of a main valve is present at the control input provided for this purpose. If the valve to be controlled is an individually operated magnetic valve there is compulsorily no corresponding actual value at the signal input for the main valve, rather a constant level is applied to this control input. This constant level is detected by the switching logic and the electronic control system is thereupon switched to individual operation. If the electric line to the d.c. voltage source supplying the aforementioned constant level is interrupted, this disturbance is detected by the switching logic which can then trigger an error detection, an alarm signal or the like. The electronic control system can be mounted directly on magnetic valves regardless of whether or not these magnetic valves are subsequently used in individual operation or in pilot operation in connection with main valves. This universal applicability of the electronic control system makes it possible to streamline manufacture and storage.

In pilot operation with the main valve being acted upon by a pressure medium, a first differential amplifier and a second differential amplifier connected downstream of the latter are active in the electronic control system. The first differential amplifier compares the reference value and actual value of the main valve and the second differential amplifier compares the output of the first differential amplifier with the actual value of the magnetic valve and supplies the regulating voltage for the magnetic valve on its output side. On the other hand, in individual operation only the second differential amplifier is active and compares the reference and actual values of the magnetic valve. Thus, the electronic control system is provided with circuit elements for individual operation and pilot operation which are not fully discrete. Rather, the second differential amplifier, for example, is used in individual operation as well as in pilot operation for generating the regulating voltage. This has the advantage not only that the expenditure on circuitry for the electronic control system is low, but also that the output end stage which is controlled by the regulating voltage and connected on the output side with the magnet of the magnetic valve is connected with the output of the second differential amplifier in every type of operation. Accordingly, only one regulating voltage output is required for both types of operation.

The electronic control system can further include an actual value output at which the actual value of the valve position of the main valve or individually operated magnetic valve can be taken off. To this end the corresponding actual value inputs are switched through to the actual value output via alternately closed switches. The switching is carried out by the same switching logic which carries out the switching between individual operation and pilot operation. The total circuit cost is accordingly kept relatively low.

To enable reliable detection of the respective desired type of operation for the switching logic, a defined d.c. voltage can be applied to the control input connected with the switching logic in individual operation by means of a contact bridge. The d.c. voltage value of this d.c. voltage lies outside the possible actual value range of the main valve so as to enable an unequivocal detection of the respective desired type of operation for the switching logic. If the contact bridge or connection to a connected actual value transmitter is interrupted, this error state can be detected and indicated by the switching logic.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawings is a view schematically showing an electronic control system for individually operated magnetic valves and for valve cascades, in accordance with the present invention.

DESCRIPTION OF PREFERRED EMBODIMENTS

The drawing shows an electronic control system for individually operated magnetic valves and for valve cascades with a magnetic valve operated as a pilot valve. The actual value S (IH) of the valve position of a main valve, not shown, is received from an actual value transmitter 1 which determines the actual valve position as path s, transforms it into an electrical actual value U (IH) and supplies it to a control input SE1 of the electronic control system. If the electronic control system is used for controlling an individually operated magnetic valve, the control input SE1 is not connected with the actual value transmitter 1, but rather is applied at a constant level of −14V via a contact bridge 2.

The control input SE1 is connected in the electronic control system with the input of a switching logic 3 and with the first input of a first differential amplifier V1. The reference value U (S) of a given valve position is present at the second input of the differential amplifier V1. The reference value U (S) can be modified by a signal transformer 4. The signal transformer 4 can adapt e.g. the offset and the level range of the reference value to the actual value U (IH).

The reference value U (S) is supplied not only to the second input of the first differential amplifier V1 via the signal transformer 4 but is also present at the input of an inverter I1. The first differential amplifier V1 and the inverter I1 can be connected on the output side via associated switches S1 and S2 with a first input of a second differential amplifier V2. The actual value U (ISP) representing the valve position of a magnetic valve operated as an individual valve or pilot valve is applied to the second input of the second differential amplifier V2. The valve position S (ISP) is picked up by an actual value transmitter 5 as path s and transformed into a voltage U as electrical actual value U (ISP).

The output of the second differential amplifier V2 supplies the regulating voltage U (R) to the regulating voltage output RA. The differential amplifiers V1, V2 and the inverter I1 form a regulator R which generates the regulating voltage U (R) as a function of present actual values and reference values.

The switching logic 3 has a first output Q and an inverse output Q which are connected with actuating magnets M1 and M2, respectively, or electronic switching inputs or electronic switches. If the level −14V is applied to the input of the switching logic 3, the switching logic 3 activates the output Q so that the actuating magnet M1 or electronic switch closes the switches S2 and S4 connected with it. The inverse output Q is not activated in this case so that the actuating magnet M2 or electronic switches allow the switches S1 and S3 associated with it to be opened. On the other hand, if the actual value U (IH) of the main valve is applied to the control input SE1 this state is detected by the switching logic 3 and the output Q and the actuating magnet M2 or electronic switch connected thereto is activated. As a result, the switches S1 and S3 are closed while the switches S2 and S4 remain open.

1. Individually operated magnetic valve

The switches S2 and S4 are closed, while the switches S1 and S3 are open. The reference value U (S) is supplied via the inverter I1 and the switch S2 to the first input of the second differential amplifier V2, the actual value U (ISP) of the individually operated magnetic valve being applied to its other input. The actual value U (ISP) is also supplied to the actual value output IA via the switch S4. The regulating voltage U (R) required to regulate the magnetic valve occurs at the output of the second differential amplifier V2.

Since the switch S1 is open, the first differential amplifier V1 is inactive.

2. Pilot operation of the magnetic valve for controlling a main valve acted upon by a pressure medium The actual value U (IH) of the main valve is applied to the control input SE1. The switches S1 and S3 are closed while the switches S2 and S4 are open. A comparison of the actual value U (IH) with the modified reference value U (S) is carried out at the first differential amplifier V1 and a corresponding control voltage which is applied to the first input of the second differential amplifier V2 is generated at the output of the first differential amplifier V1. The actual value U (ISP) of the magnetic valve whose position is adjusted by the regulating voltage U (R) provided at the second differential amplifier V2 is applied to the second input of the second differential amplifier V2.

The inverter I1 is inactive in this case due to the open switch S2. The actual value U (IH) of the main valve is applied to the actual value output IA.

It will be understood that each of the elements described above, or two or more together, may also find a useful application in other types of constructions differing from the types described above.

While the invention has been illustrated and described as embodied in an electronic control system for individually operated magnetic valves and for valve cascades, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essentially characteristics of the generic or specific aspects of this invention.

What is claimed as new and desired to be protected by Letters Patent is set forth int he appended claims.

1. An electronic control system for individually operated magnetic valves and for valve cascades with a magnetic valve operated as a pilot valve which controls a main valve acted upon by a pressure medium, the electronic control system comprising a regulator generating a regulating voltage for a magnetic valve; a signal input for an actual value of a valve position of a main valve; a switching logic which adjusts the electronic control system to individual operation when a constant level characterizing the individual operation is present at the signal input or adjusts the electronic control system to pilot operation when an actual value of a valve position of the main valve is present at the signal input, said regulator deriving the regulating voltage from a comparison of a reference value with the actual value of the magnetic valve in individual operation and from a comparison of the reference value and the actual value of the main valve in pilot operation.

2. An electronic control system as defined in claim 1; and further comprising first and second differential amplifiers, an inverter, and two switches, said signal input for the actual value of the main valve being connected with an input of said switching logic and a first input of said first differential amplifier, the reference value of valve position of the main valve or of the magnetic valve in individual operation being present at a second input of said first differential amplifier and at an input of said inverter, two outputs of said first differential amplifier and of said inverter being connected with a first input of said second differential amplifier via said switches which can be actuated in an opposite direction by said switching logic, the actual value of the valve position of the magnetic valve operated as individual valve or pilot valve being present at a second input of said second differential amplifier whose output supplies the regulating voltage.

3. An electronic control system as defined in claim 2; and further comprising a third switch and a fourth switch, the signal input for the actual value of the main valve being connectable with an actual value output via said third switch or an input for the actual value of the magnetic valve is connectable with an actual value output via said fourth switch.

4. An electronic control system as defined in claim 1; and further comprising a contact bridge, said signal input being electrically connected with a d.c. voltage source via said contact bridge during individual operation of a magnetic valve.

* * * * *